US012737417B2

(12) United States Patent
Little

(10) Patent No.: US 12,737,417 B2
(45) Date of Patent: Sep. 15, 2026

(54) USER INTERFACES FOR SOUND ENGINEERING APPLICATION ON TOUCH DEVICE

(71) Applicant: Apple Inc., Cupertino, CA (US)

(72) Inventor: Alec H. Little, Woodside, CA (US)

(73) Assignee: Apple Inc., Cupertino, CA (US)

( * ) Notice: Subject to any disclaimer, the term of this patent is extended or adjusted under 35 U.S.C. 154(b) by 454 days.

(21) Appl. No.: 18/314,774

(22) Filed: May 9, 2023

(65) Prior Publication Data

US 2024/0303269 A1 Sep. 12, 2024

Related U.S. Application Data

(63) Continuation-in-part of application No. 29/886,563, filed on Mar. 9, 2023, now Pat. No. Des. 1,065,231.

(60) Provisional application No. 63/501,120, filed on May 9, 2023.

(51) Int. Cl.
*G06F 16/635* (2019.01)
*G06F 16/64* (2019.01)

(52) U.S. Cl.
CPC ............ *G06F 16/635* (2019.01); *G06F 16/64* (2019.01)

(58) Field of Classification Search
CPC ....... G06F 16/634; G06F 16/64; G06F 16/635
See application file for complete search history.

(56) References Cited

U.S. PATENT DOCUMENTS

| | | | |
|---|---|---|---|
| 6,904,565 B1 | 6/2005 | Lentz | |
| 8,788,972 B2 * | 7/2014 | Garrison | G06F 3/04847 345/169 |
| 2003/0020756 A1 | 1/2003 | Bates et al. | |
| 2005/0138559 A1 | 6/2005 | Santos-Gomez et al. | |
| 2006/0053372 A1 | 3/2006 | Adkins et al. | |
| 2006/0277468 A1 | 12/2006 | Sapir | |
| 2007/0136286 A1 * | 6/2007 | Webster | G06F 16/61 |
| 2009/0132919 A1 | 5/2009 | Allen et al. | |
| 2013/0125041 A1 | 5/2013 | Doan et al. | |
| 2013/0197899 A1 | 8/2013 | Roulland et al. | |
| 2013/0339853 A1 * | 12/2013 | Hierons | G06F 16/686 715/716 |
| 2014/0173474 A1 | 6/2014 | Klemenz et al. | |
| 2016/0350137 A1 | 12/2016 | Kihara | |

(Continued)

FOREIGN PATENT DOCUMENTS

WO 2020/150518 A1 7/2020

*Primary Examiner* — Fan S Tsang
*Assistant Examiner* — Tyler Michael Liebgott
(74) *Attorney, Agent, or Firm* — Invoke

(57) ABSTRACT

A system reorders filters in a set of the filters that may be used to update a list of content. In response to receiving user input selecting a particular filter, the system may filter and/or reorder the content in the list of content and reorder the remaining un-selected filters. Filters that would result in a more even split of the content may be ranked higher than filters that would result in a less even split of that content. A filter that would result in selection of half of the content would be ranked higher than another filter that would result in selection of one-fourth or three-fourth of the content. The system may rank filters based on a user's historical usage. The system may apply a variety of factors to select an order for the filters by, for example, using a weighted average of scores that correspond respectively to the factors.

19 Claims, 10 Drawing Sheets

(56) References Cited

U.S. PATENT DOCUMENTS

| | | | | |
|---|---|---|---|---|
| 2017/0235833 | A1* | 8/2017 | Saraya | G06F 3/04847 707/722 |
| 2018/0218422 | A1* | 8/2018 | Gungor | G06F 16/9535 |
| 2020/0043363 | A1 | 2/2020 | Grossman et al. | |
| 2021/0243265 | A1* | 8/2021 | Hammond | H04L 67/535 |
| 2022/0004286 | A1 | 1/2022 | Alldredge et al. | |
| 2022/0050582 | A1 | 2/2022 | Zhou et al. | |
| 2022/0067811 | A1* | 3/2022 | Agrawal | G06F 16/9035 |
| 2022/0091863 | A1 | 3/2022 | Ignatowicz et al. | |
| 2022/0156094 | A1 | 5/2022 | Morrise | |
| 2022/0366810 | A1 | 11/2022 | Chan et al. | |

* cited by examiner

USER INTERFACES FOR SOUND ENGINEERING APPLICATION ON TOUCH DEVICE

INCORPORATION BY REFERENCE; DISCLAIMER

Each of the following applications are hereby incorporated by reference: application No. 63/501,120 filed on May 9, 2023; Design patent application Ser. No. 29/886,563 filed on Mar. 9, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to the use of touch interface in media production applications and to operations for filtering and sorting media samples.

BACKGROUND

Applications for media production include various tools for recording, editing, arranging, and mixing digital media data. Currently available production applications include a myriad of user interface elements for performing different functions and operations. Engaging the interface elements using a traditional cursor controlled with a mouse or touchpad limits a user's ability to interact with the interface elements. Further, available media production applications are limited in their ability to facilitate an effective filtering and sorting process on a large number of media samples to present a user with a manageable number of matches.

OVERVIEW

A system concurrently displays a list of content and a set of filters that may be used to update the list. In an example, a list of thousands of media samples may be filtered to generate a list of less than one hundred media samples.

One or more embodiments reorder filters in the set of the filters that may be used to update the list of content. The system may receive user input selecting a particular filter. In response to receiving the user input selecting the particular filter, the system may filter and/or reorder the content in the list of content. Furthermore, in response to receiving the user input selecting the particular filter, the system may reorder the remaining unselected filters. In an example, the system may rank (a) filters that would result in a more even split of the content higher than (b) filters that would result in a less even split of that content. Accordingly, a filter that would result in selection of half of the content, applicable to the currently selected filters, would be ranked higher than another filter that would result in selection of one-fourth or three-fourth of the content. In another example, the system may rank filters based on a user's historical usage. Filters that have been selected more frequently by a user in the past may be ranked higher than other filters that have not been selected as frequently by the user. The system may continue to reorder the remaining filters with each user input selecting one of the available filters. The system may apply a variety of factors to select an order for the filters by, for example, using a weighted average of scores that correspond respectively to the factors.

One or more embodiments display a touch interface to control user interaction with a media production application. Touch interfaces allow for tapping, swiping, touching, hovering, and holding, or multiple simultaneous touches to control, for example, selection of filters and content. In response to a touch input selecting a filter, the system may apply the selected filter to update a list of content. Alternatively, in response to a touch input selecting a filter, the system may display selectable sub-filters that are associated with the selected filter. When one or more sub-filters have been selected by a user, the system may annotate an interface element, corresponding to the filter, to indicate the number of sub-filters that have been selected. Furthermore, the system may present a display for scrolling through filters based on touch input such as swiping input.

One or more embodiments improve the usability of a function bar that displays icons representing different functions. The function bar may display any number of functions that a user may perform including, for example, trimming, cropping, copying etc. The system may receive user input selecting a user interface element that displays an icon representing a function. In response to receiving the user input, the system modifies the user interface element from displaying the icon to displaying the icon and a textual description of the function associated with the icon. The system may temporarily modify the size of the user interface element to allow for additional room on the user interface element to display the description. As an example, when a user selects a user interface element displaying a scissor icon, the system increases the size of the user interface element and displays "cut" next to the scissor icon. The system's display (e.g., temporary display) of the description allows the user to confirm that the user's intended function has in-fact been selected.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Filtering and Sorting Operation

Figure 1:
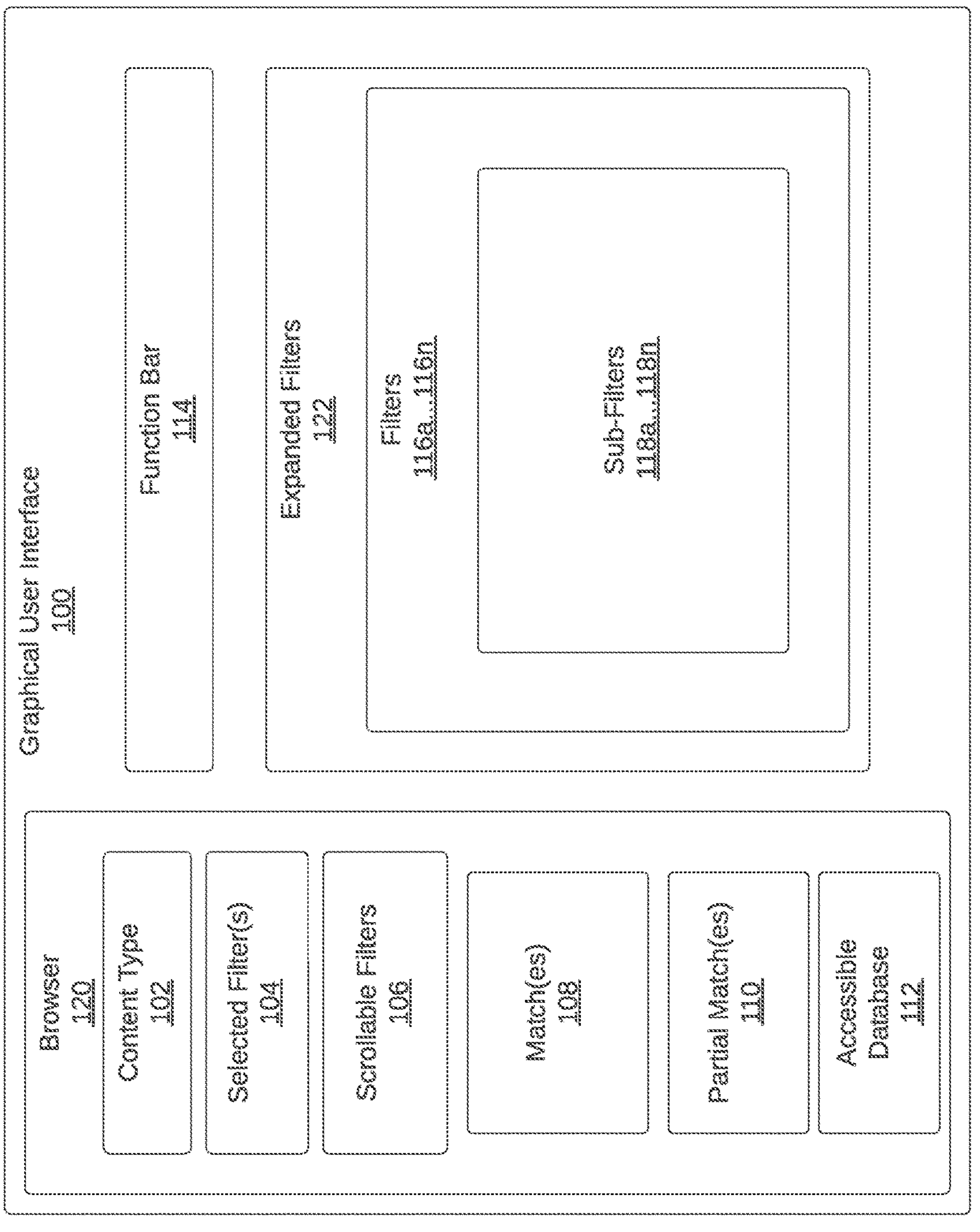
FIG. 1 is a block diagram of an example graphical user interface for a media production application.

FIG. 1 is a block diagram of a graphical user interface (GUI) 100 of a filtering and sorting operation for a media production application. Although the use of touch interface and the filtering and sorting operation will be shown and described as relates to a media production application, and audio media more particularly, the disclosed use of touch interface and the filtering and sorting operations are also applicable to visual media.

The GUI 100 includes interfaces for displaying and providing user selections of, a content type 102, selected filters 104, scrollable filters 106, matches 108, partial matches 110, an accessible database 112, function bar 114, filters 116*a* . . . 116*n*, and sub-filters 118*a* . . . 118*n*. The interfaces for the content type 102, the selected filters 104, the scrollable filters 106, the matches 108, the partial matches 110, and the accessible database 112 are contained within an interface identified as a browser 120. The components of the browser 120 utilize touch interface to perform a filtering and sorting operation. More particularly, the browser components operate to filter and sort locally stored and/or downloadable media content using touch interface, and to present the content that matches the selected filters in order of diminishing relevance to the selected filters. The filters 116*a* . . . 116*n* and the sub-filters 118*a* . . . 118*n* are displayed in an interface identified as expanded filters 122. The expanded filters 122 provides an expanded view of all the available and non-available filters associated with the filtering and sorting operation of the media production application.

Content type 102 displays a type of content selected for filtering. Examples of content type include instrument patches, audio patches, loops, samples, plug-in presets, and patterns. As will be described in further detail below, selection of a content type 102 initiates a filtering and sorting operation.

Selected filter(s) 104 displays one or more filters selected by a user during the filtering and sorting operation. Initially, when no filter is selected, the display appears blank. As each additional filter is selected, the selected filter is displayed in the selected filter(s) 104. As will be described in further detail below, the representation of the one or more filters displayed in the selected filter(s) 104 includes the same attributes, e.g., color, shading, style, indicators, as the filter displayed in the expanded filters 122. Filters of the same filter category include one or more of the same attributes, e.g., color, text style, text font.

Scrollable filters 106 display recommended filters available for selection by a user. The scrollable filters may be presented as a single row of filters arranged horizontally, or in multiple rows of filters arranged horizontally with one row over another row. As will be described in further detail below, a user may interact with the scrollable filter 106 to scroll through the filters. As will also be described in further detail below, the filtering and sorting operation displays the scrollable filters in order of a next best choice(s). As each additional filter is selected, the order of the filters presented in the scrollable filters 106 resorts to present the filters in order of a next best choice. A filter that is a next best choice is a filter that, when selected, divides or splits the number of matches remaining after the previous filtering operation approximately in half.

Matches 108 displays the results of the filtering and sorting operation. The matches are a vertically scrollable list of loops, instrument tracks, and other media samples, collectively referred to herein as media samples, presented as a result of the filtering and sorting operation. The media samples are stored locally, i.e., on the device being used to operate the media production application. Each media sample is assigned one or more tags that are descriptive of the media sample. The media samples available for selection using the filtering and sorting operation were tagged by subject matter experts. It is envisioned that untagged media samples may be tagged using a machine learning model trained on the tagged media samples, and the newly tagged media samples may be added to the available media samples.

The tags used to sort the media samples correspond to filters 116*a* . . . 116*n* and sub-filters 118*a* . . . 118*n*. As will be described in further detail below, during the filtering and sorting operation, selection of a filter will return a list of media samples that include the tag corresponding to the selected filter. Each of the media samples presented in the matches 108 includes at least the tag corresponding to the selected filter. Selection of each additional filter reduces the number of results presented in the matches 108. As will be described in further detail below, the matches are arranged in order of relevance to the selected filters, with the most relevant matches appearing first. The media samples displayed in matches 108 are available for immediate use by the user.

Selection of a filter corresponding to a tag identifies, as a match, all media samples that include that tag. The matches 108 are presented in order of relevance to the selected filters 104. Each match of the matches 108 includes a tag corresponding to each of the selected filters. As will be described in further detail below, the filters and tags include non-Boolean filters and percentage tags which are used to indicate that a media sample is neither all one characteristic nor all another, opposite, characteristic, and is instead, somewhere in between. The percentage tags corresponding to the non-Boolean filters are used to arrange the matches in order of relevance. “Bright” and “Dark” are examples of non-Boolean tags. “Bright” is on the opposite end of a spectrum of “Dark”. A media sample that is fully bright is assigned a brightness rating of 1 and a media sample that is fully dark is assigned a brightness rating of 0. Similarly, a media sample that is fully dark is assigned a darkness rating of 1 and a media sample that is fully bright is assigned a darkness rating of 0.

Assigning a percentage between 0 and 1 to a media sample indicates that the media sample is only partially “Bright” or only partially “Dark”. The percentage to which a media sample is partially a specified characteristic is used to rank the filtered matches. For example, when “Bright” is selected as a filter, all media samples including a tag for the selected filter “Bright” will appear in the filtered matches. However, a media sample with a brightness percentage tag of 0.7 will be displayed ahead of a media sample with a brightness percentage tag of 0.6. In this manner, a media sample that is a closer match to the selected filters, i.e., brighter than another media sample, will be ranked ahead of the media sample with the lower percentage tag.

Figure 7:
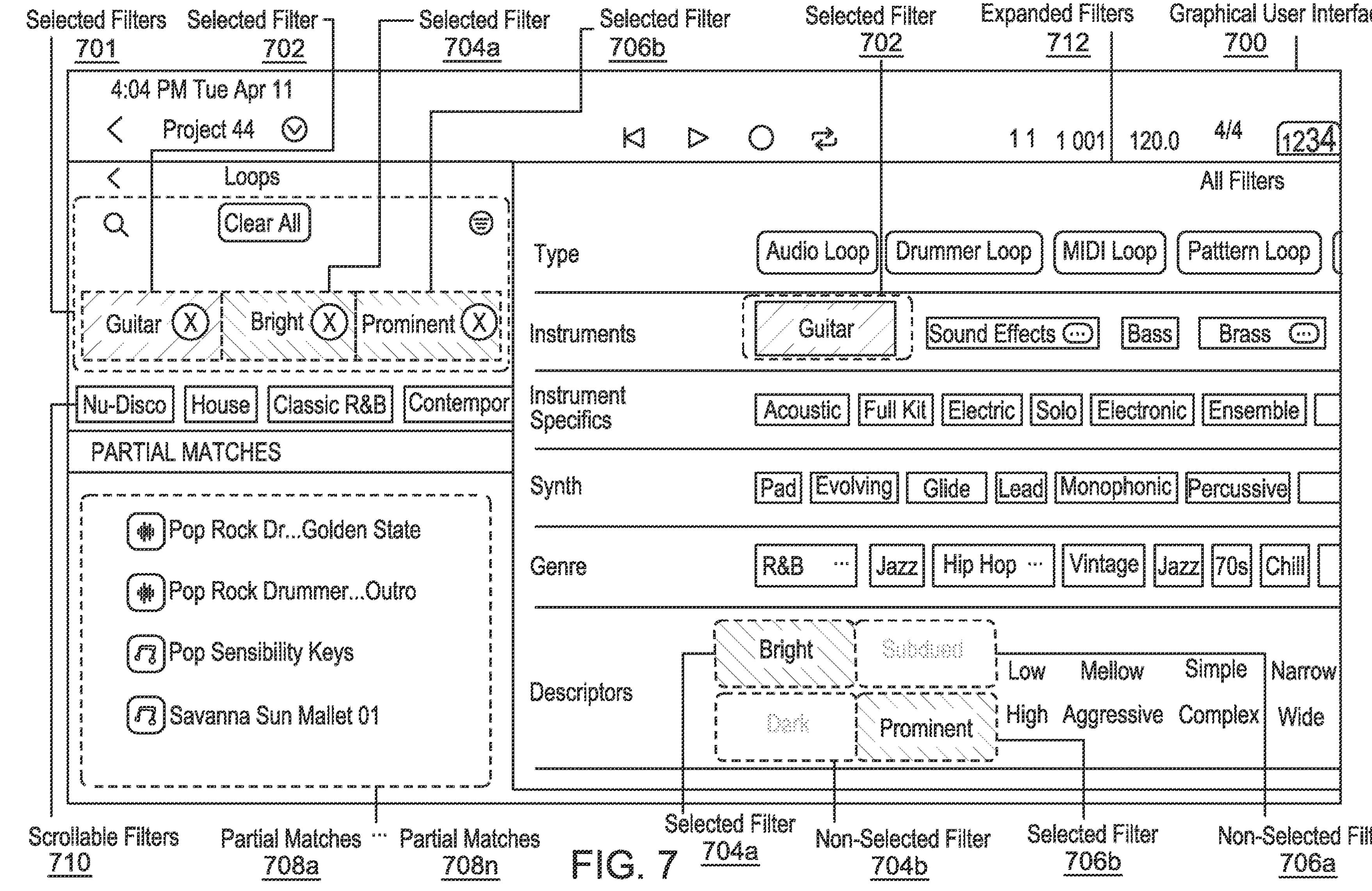
FIG. 7 is a screenshot illustrating visual indications for selected filters in a filtering and sorting operation.

For example, when “Guitar”, “Bright”, and “Prominent” are the selected filters, as seen in FIG. 7, multiple matches may include tags corresponding to “Guitar” and “Bright” and “Prominent”. To provide the matches in a manner of relevance, the matches are presented in order of the percentage tags. As described above, a match having a brightness tag of 0.6 would be rated above a match having a brightness tag of 0.5. The filtering and sorting operation accounts for multiple non-Boolean tags when determining an order for presenting the media samples displayed in the matches 108. The media samples presented in the matches 108 are available for immediate selection by the user. For example, the media sample may be dragged and dropped into other interfaces within the media production application by touching and holding on the media sample until the media sample is engaged, and then dragging the media sample to the desired location.

Partial matches 110 also displays results of the filtering and sorting operation. The partial matches also include loops, instrument tracks, and other media samples, collectively referred to herein as media samples, and are also presented in an order of relevance. Unlike with the matches 108 described above, where each media sample identified as a match includes a tag corresponding to each of the selected filters, the media samples presented in the partial matches 110 are missing at least one of the tags corresponding to at least one of the selected filters. For example, when "Guitar", "Bright", and "Prominent" are the selected filters, as seen in FIG. 7, a partial match may include "Guitar" and "Bright", but not include "Prominent", or include "Bright" and "Prominent", but not include "Guitar", or include "Guitar" and "Prominent", but not include "Bright". The number of tags a media sample has corresponding to the number of selected tags is used in determining the order of presentation of the partial matches 110. As described above with regards to the matches 108, non-Boolean filters and percentage tags are also used to rank the partial matches 110 by relevance. The media samples displayed in the partial matches 110 are available for immediate use by the user.

The accessible database 112, also referred to as a sound library, displays information about additional media samples that are not available locally, i.e., saved on the device being used to operate the media production application, but that their tags are known they available for download. More particularly, the media production application does not include the full content of the media samples available for download, however, the filtering and sorting operation include knowledge of tags for the additional media samples. During the filtering and sorting operation, the tags of the media samples available for download are analyzed and the accessible database 112 displays the number of media samples that include the one or more tags that correspond to the one or more selected filters. Each time a filter is selected, the filtering and sorting operation analyses the tags of the media samples available for download, and updates the display of the number of matches available for download. In this manner, the filtering and sorting operation accounts for additional media samples while appreciating limitations on available resources, including memory and storage.

Function bar 114 provides an interface for selecting a tool or operation from a variety of tools or operations for editing the media samples. Any of the interfaces of the GUI 100 may include a function bar 114. The function bar 114 allows a user to determine what operation is performed by a user's touch within the interface to which the function bar 114 is attached. The editing tools or operations may include "Trim", "Undo", "Cut", "Copy", "Extend", "Split", and "Multiple Selections".

The tools or operations provided in the function bar 114 may vary depending on a type of content selected or the type of mode, and/or on which interface the function bar 114 is attached. The editing tools and operations that are not available for selection are omitted from the function bar 114.

To optimize space in the function bar 114, the editing tools and operations that are available for selection may each be represented by a glyph. For example, a glyph of the "Cut" editing tool may be a graphic of scissors. When an editing tool or operation is selected, the background around the graphic may be highlighted, or otherwise visually changed, to indicate selection of the editing tool. A text label may also be included next to the glyph of the selected editing tool. The visual presentation of the non-selected editing tools may remain unchanged as the other editing tools remain available for selection. As will be described in further detail below, the touch interface allows for a clutchable or releasable selection of an editing tool or operation which temporarily selects the editing tool or operation.

Filters 116*a* . . . 116*n* and sub-filters 118*a* . . . 118*n* are user selectable elements for filtering and sub-filtering media samples. The filters 116*a* . . . 116*n* and sub-filters 118*a* . . . 118*n* are displayed as text in the expanded filters 122, and as described below, in some instances, may include an indication of an availability of sub-filters. The filters 116*a* . . . 116*n* may be provided in rows or columns and may be arranged by categories. For instance, filters 116*a* . . . 116*n* may be included in a filter category identified as "Type". Filters in the "Type" filter category may include "Audio Loop", "Drummer Loop", "MIDI Loop", and "Pattern Loop". Additional filter categories may include "Instruments", "Instrument Specifics", "Synth", "Genre", "Descriptors", and "Performance". Each filter included within a filter category may include the same attributes, e.g., text color, text style, text font, to visually indicate filters of the same filter category. Filters that are not available for selection, because they are unrelated to the selected type of content and/or were eliminated by a selection of a filter, are faded or grayed out, and are unavailable for selection by the user. As shown and described, when a filter is selected, the background of the interface element representing the filter becomes highlighted, hatched, or otherwise changes to indicate selection. In some embodiments, selection of a filter removes the filter from the displayed list of filters.

Some filters 116*a* . . . 116*n* include paired filters. Paired filters offer a yin and yang selection, i.e., are opposites of one another. When one filter of the paired filters is selected, the other of the paired filters is no longer available for selection. For example, the category of filters referred to as "Descriptors" includes paired filters "Tonal" and "Non-Tonal". "Non-Tonal" is the opposite of "Tonal". When a user selects "Tonal", the background around "Tonal" becomes highlighted to indicate selection of "Tonal", and "Non-Tonal" darkens to indicate "Non-Tonal" is no longer available for selection.

Figure 5:
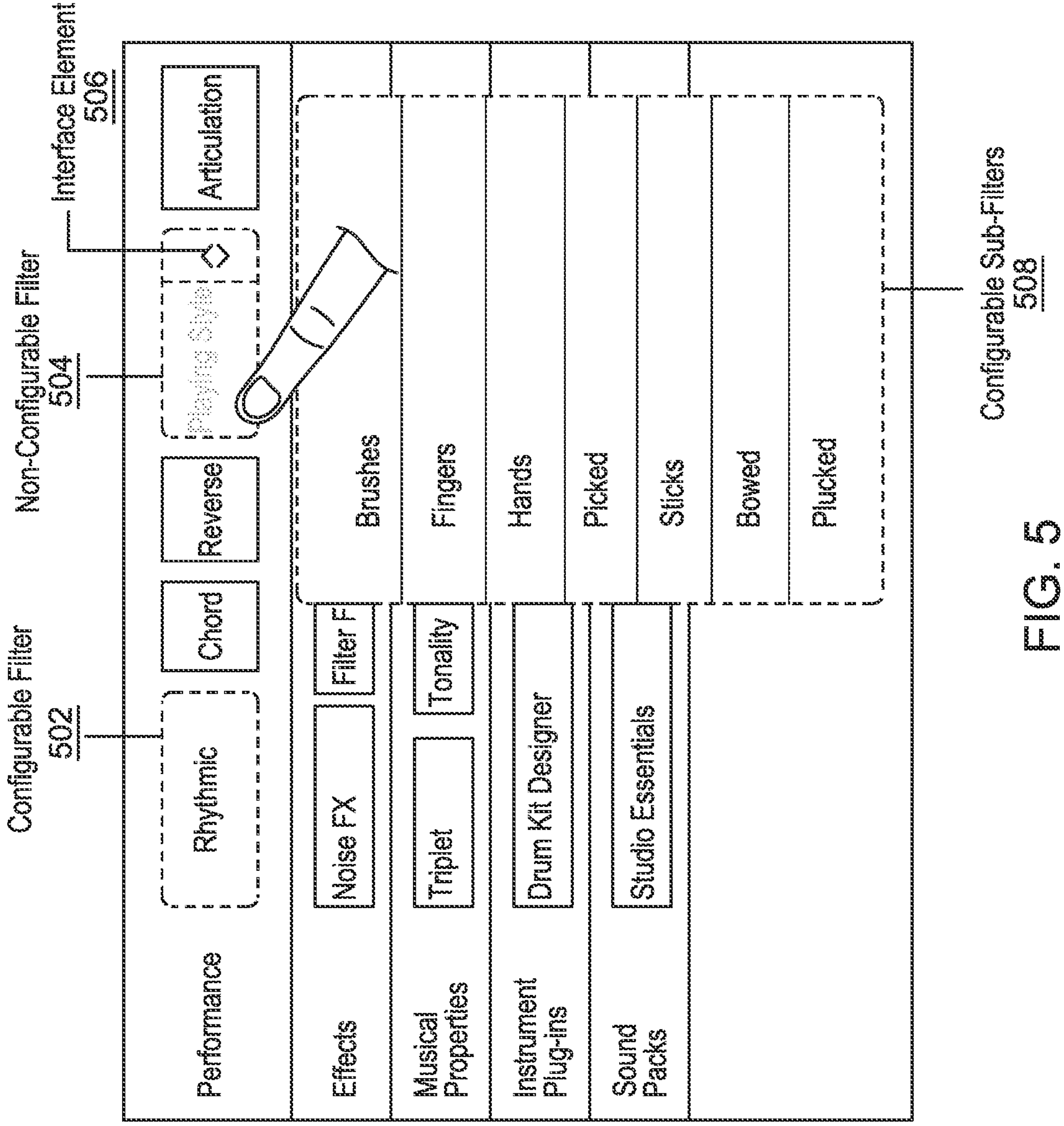
FIG. 5 is a screenshot illustrating configurable and non-configurable filters for a filtering and sorting operation.

Some of filters 116*a* . . . 116*n* include sub-filters 118*a* . . . 118*n*. These filters and sub-filters may be configurable or non-configurable. A configurable filter is a filter that, itself, can be selected as the filter corresponds to a parameter for which a tag is assigned. A non-configurable filter is a filter that cannot, itself, be selected as the filter does not correspond to a parameter for which a tag could be assigned. Instead, the non-configurable filter is a category for which there are sub-filters. A non-configurable filter may be indicated by a glyph positioned at the end of text of the filter. For example, as shown in FIG. 5, in the filter category "Performance", "Rhythmic" is an example of a configurable filter, and "Playing Style" is an example of non-configurable filter. "Rhythmic" may be selected as a performance type while "Playing Style" is not a performance type, and therefore cannot be selected as such. "Playing Style" is indicated as a non-configurable filter by a glyph located adjacent the text. "Playing Style" is a category, and as such, the selection of "Playing Style" requires selection of one or more of its sub-filters. Sub-filters available for "Playing Style" may include "Brushes", "Fingers", "Hands", "Picked", "Sticks", "Bowed", and "Plucked".

Figure 4:
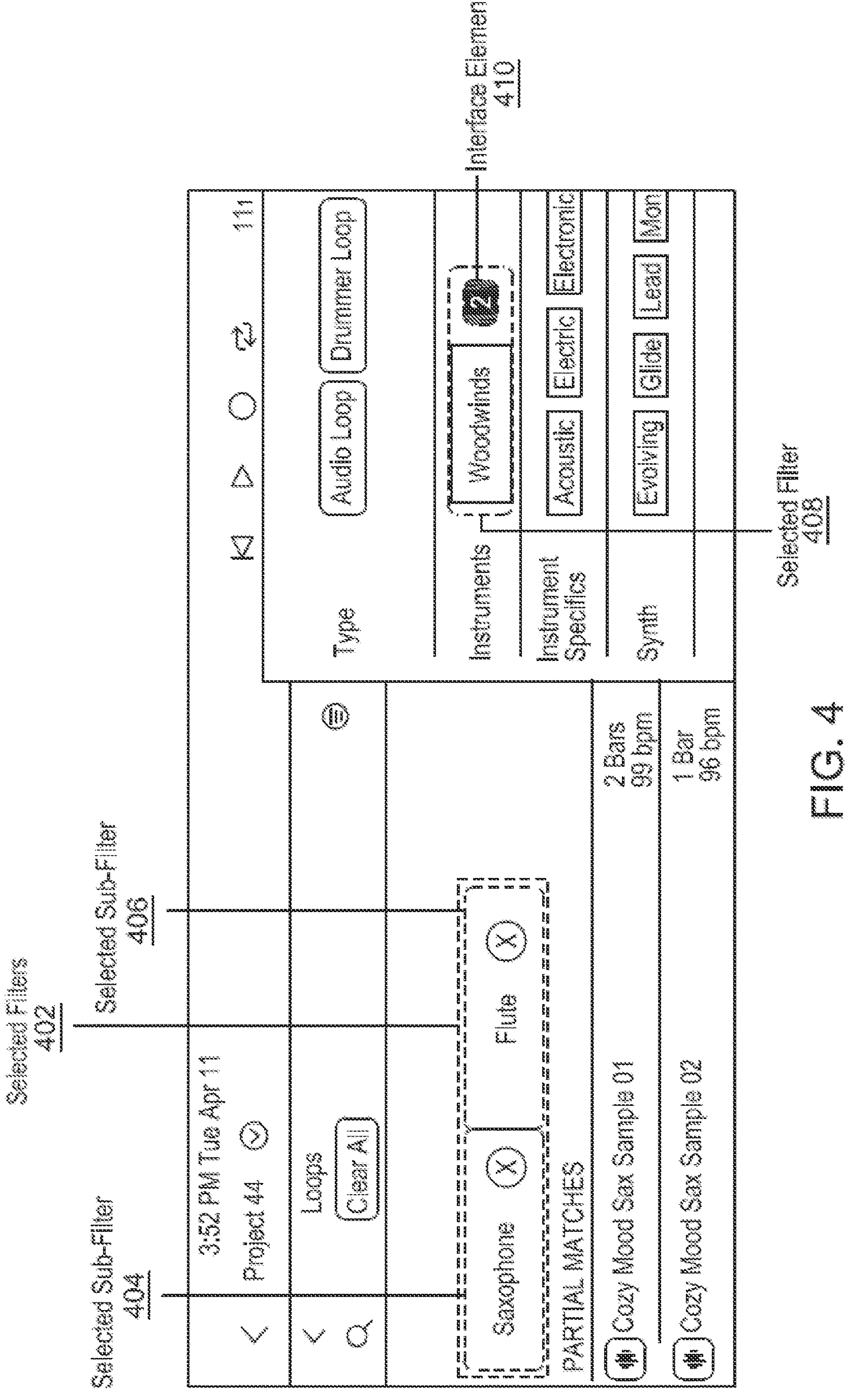
FIG. 4 is a screenshot illustrating selection of multiple sub-filters of a filter in a filtering and sorting operation.

Other types of filters with sub-filters are configured such that the entire filter or one or more of the sub-filters may be selected. When the filter is selected, a match may include a tag corresponding to one or more of the sub-filters. Conversely, when individual sub-filters are selected, a match includes a tag corresponding to each of the selected sub-filters. The number of selected sub-filters may be provided visually as a number appearing next to the text of the selected filter. For example, as shown in FIG. 4, when two sub-filters, e.g., "Saxophone" and "Flute", are selected from the filter "Woodwinds", a "2" appears next to the text of the filter, e.g., "Woodwinds".

Figure 2:
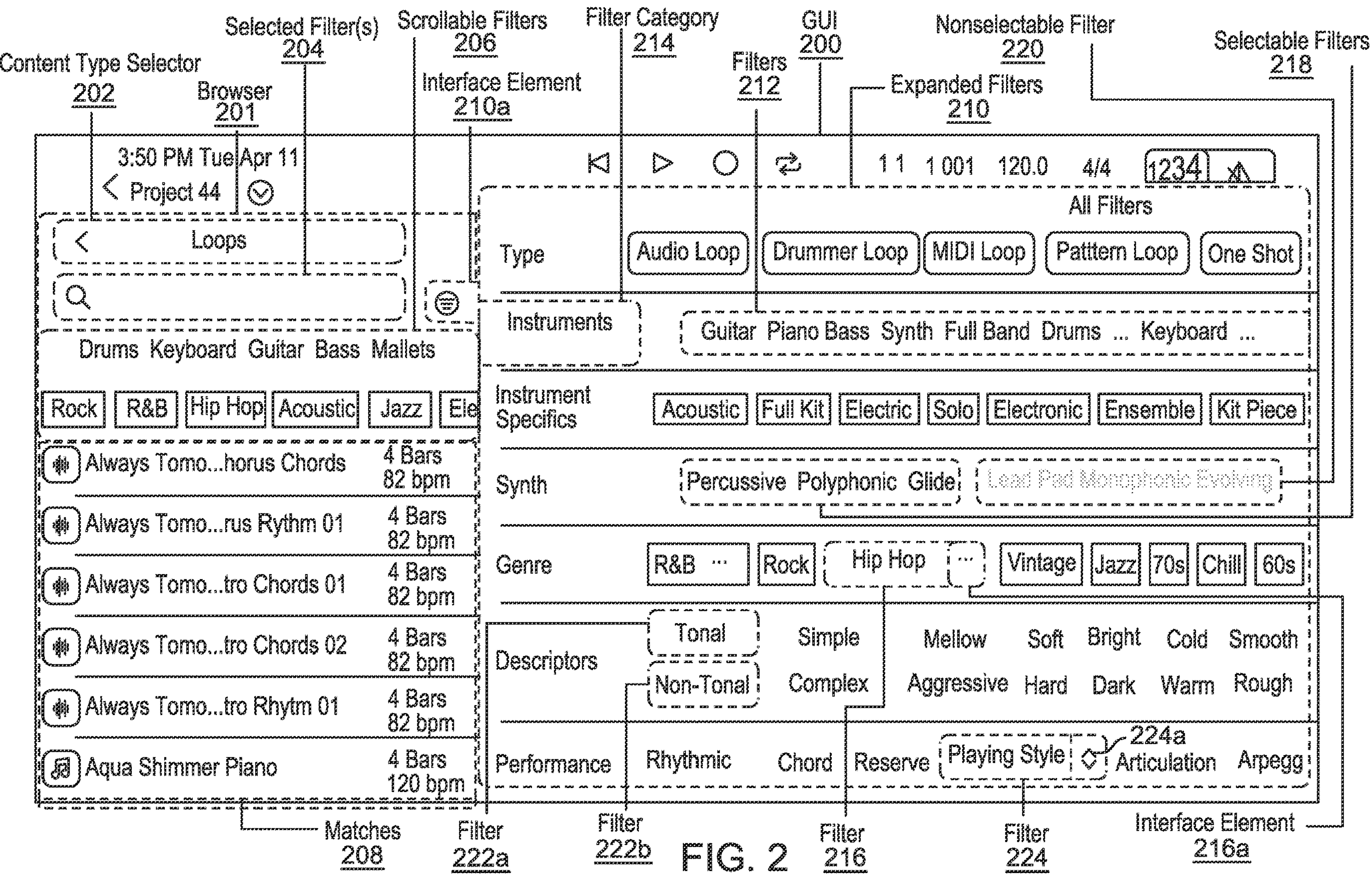
FIG. 2 is a screenshot illustrating various filter selection interfaces for filtering and sorting operation of the media production application.

FIG. 2 is a screenshot of a graphic user interface ("GUI") 200 for executing a filtering and sorting operation. Although the illustrations and examples provided herein relate predominately to audio media, presently disclosed interfaces and operations are applicable to visual media. The GUI 200 utilizes touch access to control user interfacing with the operations of the media production application, including the filtering and sorting operation.

The GUI 200 includes a browser 201 and an expanded filter 210. The browser 201 includes the following interfaces, a content selector 202, selected filter(s) 204, scrollable filters 206, and matches 208. The browser 201 provides a user with interfaces to perform a filtering and sorting operation on a database of media samples to identify matches. The expanded filters 210 displays all filters available for use in the filtering and sorting operation. When a user is performing operations other than the filtering and sorting operation, the expanded filters 210 is minimized, and may be accessed by tapping an interface element 210*a*.

Content Selector 202 displays a type of content selected by the user for sorting. Types of content that are available for sorting include "Instrument Patches", "Audio Patches", "Loops", "Samples", "Plug-In Presets", and "Patterns". As shown, the content selector 202 indicates that "Loops" is the selected content type. A pop-up or pull-down interface may be activated by tapping the "<" glyph in the content selector 202 to allow for selection of a different content type. Selecting a content type initiates the filtering and sorting operation. More particularly, when a content type is selected, media samples that include a tag for the type of content selected are identified as matches and are displayed in matches.

Selected filter(s) 204 displays filters that have been selected by a user. When, as shown in FIG. 2, no filter is selected, the selected filter(s) 204 is blank. As filters are selected, from either the scrollable filters 206 or the expanded filters 210, the text of the selected filter is displayed in the selected filter(s) 204. The text of the selected filters is presented with the same attributes, e.g., highlighting, hatching, coloring, style, as presented in the expanded filters 210. A selected filter may be manipulated in the selected filters(s) 204. For example, a user may tap and hold the selected filter to engage a "NOT" filter. The "NOT" filter excludes any media samples that include a tag for the selected "NOT" filter. The selected filter appears in the selected filters 204 as text with a strikethrough. Each filter appearing in the selected filter(s) 204 includes an interface element in the form of an "X". Selection of the "X" interface element unselect a selected filter. Unselecting a selected filter causes removal the filter from the selected filter(s) 204.

Scrollable filters 206 display an ordered selection of filters to the user for selection. As shown, the scrollable filters are presented in two rows of filters. The filters presented in each of the first and second rows of filters are arranged in order of next best choice. As relates to the filtering and sorting operation, the next best choice is a filter that, when selected, divides a set of media samples approximately in half. In this manner, the filtering and sorting operation includes analyzing the tags of each of set of media samples. The media samples are available locally on the device being used perform the filtering and sorting operation and/or that are available for download. The set of media samples may have already been filtered one or more times. From the set of media samples, the sorting and filter process determines which of the filters will most closely divide the set of media samples in half. A filter that would result in a more even split of the remaining set of media matches will be presented ahead of a filter that would result in a less even split of the remaining media matches. The order of presentation of the filters in the scrollable filters 206 is also at least partially based on user history.

As shown, with a selected content type of "Loops", a first row of the scrollable filters 206 displays "Drums", "Keyboards", "Guitar", "Bass", and "Mallets", and a second row of the Scrollable Filters 206 displays "Rock", "R&B", "Hip Hop", "Acoustic", "Jazz". The filters in each row may be from the same filter category, as seen in the first row of the scrollable filters 206, or the filters may be from different filter categories, as seen in the second row of the scrollable filters 206.

As noted above, the next best choice is a filter that will most closely divide a set of media samples in half. User history is also taken into consideration when arranging the order of presentation of a filter that is a next best choice. In this manner, over time, the more selections a user makes, the more user particular the filtering and sorting operation may become at presenting filters the user may select. The more familiar the filtering and sorting operation becomes with a user's preferences, the more precise the filtering and sorting operation will be in recommending next best choices.

Matches 208 displays a list of media samples that each include every tag corresponding to the selected filters. A media sample that includes all the tags corresponding to each of the selected filters is a match. As will be described in further detail below, a partial match is a media sample that includes tags corresponding to less than all of the selected filters. Partial matches are displayed as a list at the end of the list of matches.

As shown, the matches presented are a list of media samples that are identified for the content type "Loops". The matches are presented in alphabetical order as each of the media samples includes a tag corresponding to the "Loops" content type, and no other filters are selected. When a filter is selected, the matches 208 are filtered to remove media samples that do not include the tag corresponding to the selected filter. The media samples matching the selected filters are resorted and presented in diminishing rank based on relevance of the media samples to the selected filters.

As noted above, non-Boolean filters and corresponding percentage tags are used in ranking the media samples that match the selected filters. Matches resulting from selection of filters corresponding to non-Boolean tags are sorted based on the percentage or degree of a characteristic the media sample possesses. For example, as shown in FIG. 2, "Simple" and "Complex" are a paired set of non-Boolean or percentage filters in the filter category "Descriptors. "Simple" and "Complex" correspond to percentage tags that identify a percentage of simpleness and complexness, respectively, of a media sample. A media sample that is fully simple is assigned a simpleness rating of 1 and a media sample that is fully complex is assigned a simpleness rating of 0. Similarly, a media sample that is fully complex is assigned a complexness rating of 1 and a media sample that is fully simple is assigned a complexness rating of 0. Media samples that are partially simple or partially complex are assigned a percentage tag between 0 and 1. A media sample with a percentage tag of 0.8 is ranked higher than a media sample with a percentage tag of 0.2. The filtering and sorting operation uses the percentage tags to arrange the matches in an order of relevancy, from highest to lowest.

Expanded Filters 210 includes a display of "All Filters" available for use in the filtering and sorting operation. The filters are divided into categories. For example, filter category 214 is identified as "Instruments". Other filter categories include "Type", "Instruments Specifics", "Synth", "Genre", "Descriptors", and "Performance". The filter categories are arranged in rows with the filter category listed on the left and a row of filters arranged horizontal on the right. The filters for the filter category identified as "Instruments" includes "Guitar", "Piano", "Bass", "Synth", "Full Band", "Drums", and "Keyboard".

Available filters are positioned in rows and are sorted in order of next best choice, from left to right. As described above, the next best choice is a selection intended to divide the set of media samples identified as matches approximately in half. Filters that are available for selection by the user are shown as normal text. Filters that are not available for selection by the user are shown as faded or grayed out text. For example, selectable filters 218, including "Percussive", "Polyphonic", and "Glide", are shown as normal text, and non-selectable filters 220, including "Lead", "Pad", "Monophonic", and "Evolving", are shown as faded text, and are unavailable for selection by the user.

As will be described in further detail below, filters that include a subset of filters are indicated with one of two glyphs. For example, filter 216, identified as "Hip Hop", includes an interface element 216*a* in the form of three dots. The interface element 216*a* provides visual indication that the filter "Hip Hop" includes sub-filters. Selection of the interface element 216*a* by the user opens an interface including a list of the "Hip Hop" sub-filters. Similarly, filter 224, identified as "Playing Style", includes an interface element 224*a* in the form of an upward pointing arrow superimposed over a downward pointing arrow. The interface element 224*a* provides a visual indication that the filter "Playing Style" includes sub-filters. As described above, "Playing Style" is referred to as a non-configurable filter, which means the filter itself cannot be selected, and requires selection of at least one sub-filter.

The filters in the filter category "Descriptors" are presented as sets of paired filters. As described above, paired filters are opposites of one another. When one of the paired filters is selected, the second of the paired filters is unavailable for selection. A selected filter of the paired filters is indicated with a highlighted or hatched background. An unselected filter of the paired filters is faded or grayed out. Filters 222*a*, 222*b*, identified as "Tonal" and "Non-Tonal", are paired filters. "Tonal" is the opposite of "Non-Tonal". When "Tonal" is selected, "Non-Tonal" is no longer available for selection. As also described above, "Tonal" and "Non-Tonal" are referred to as non-Boolean or percentage filters. A media sample that is neither fully tonal nor fully non-tonal is assigned a percentage tag that is used to sort order of presentation of the matches.

Figure 3:
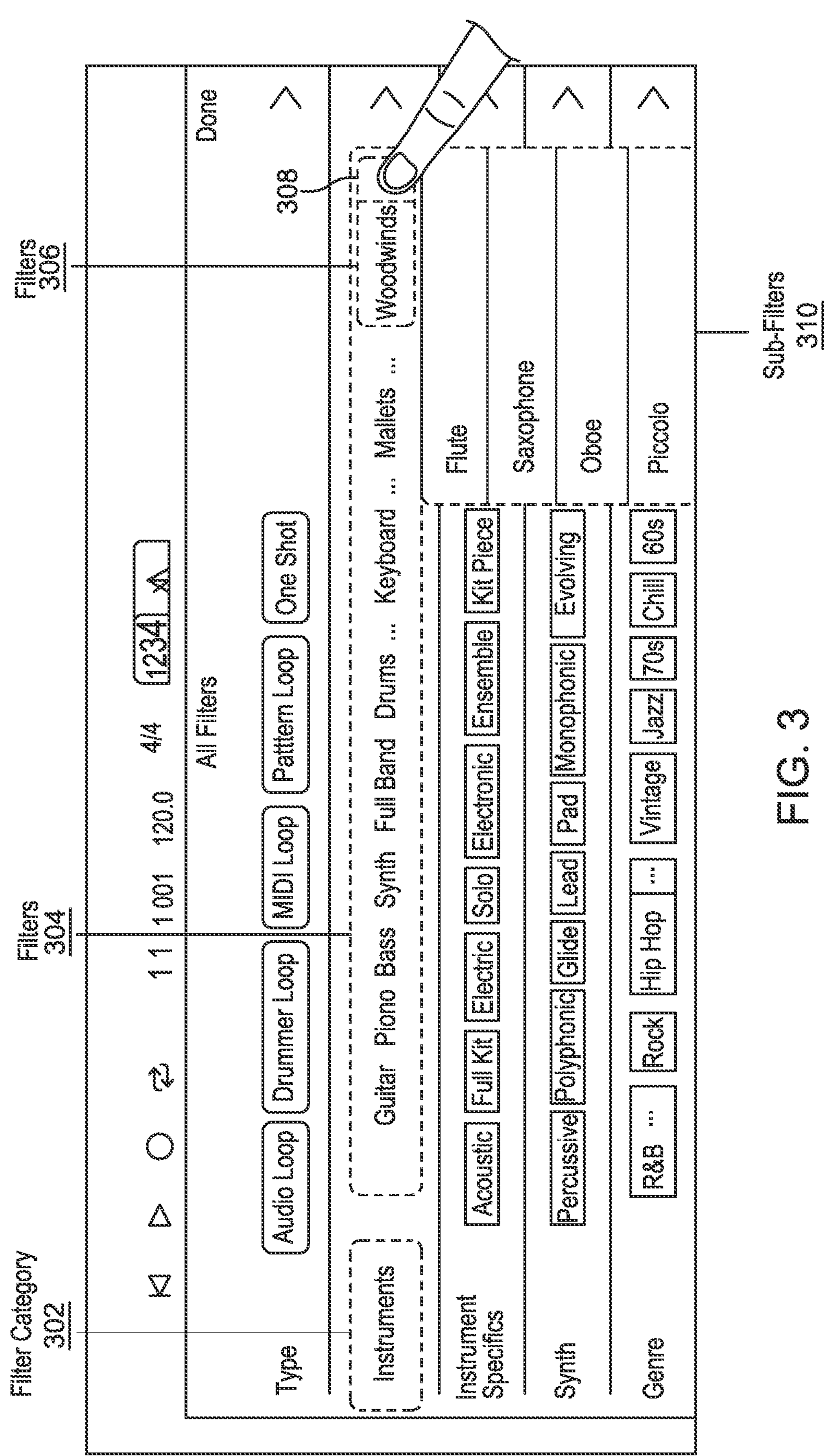
FIG. 3 is a screenshot illustrating filters and associated sub-filters for a filtering and sorting operation.

FIG. 3 illustrates selection of a filter with sub-filters. As shown, filter 306, identified as "Woodwinds", is in a row of filters 304 presented in filter category 302, identified as "Instruments". Filter 306 includes an indication, in the form of an interface element 308, that sub-filters are available for "Woodwinds". The sub-filters offer more granular or particular selections for the filter. As noted above, "Woodwinds" may itself be selected as a filter. As such, "Woodwinds" is a configurable filter. The interface element 308 includes three dots (" . . . "), positioned adjacent "Woodwinds". As shown in FIG. 3, the three dots of the interface element 308 are covered by the graphic of a finger. See, for example, filters indicated as "Drums . . . " and "Keyboards . . . ".

Selecting the interface element 308, as indicated by a graphic of the finger tapping the interface element 308, opens an interface with a list of sub-filters 310. The sub-filters 310 identified for "Woodwinds" include "Flute", "Saxophone", "Oboe", and "Piccolo". One or more of the sub-filters 310 may be selected by tapping the desired sub-filter. Selecting subsequent sub-filters may require tapping the " . . . " to re-open the sub-filter interface to provide access to the sub-filters 310. Previously selected sub-filters are presented with a checkmark (not shown) or other visual indication, e.g., highlighting or hatching of the background of the sub-filter, that informs the user that the sub-filter is selected. Tapping on a selected sub-filter unselects the selected sub-filter. When a sub-filter is unselected, the checkmark or other visual indication of the sub-filter being selected disappears.

FIG. 4 is a screenshot illustrating a graphical user interface when one or more sub-filters of a filter are selected. A selected filter 402 of filtering and sorting operation of the media production application displays a first selected sub-filter 404 and a second selected sub-filter 406. The first selected sub-filter 404 and the second selected sub-filter 406 are sub-filters of a selected filter 408. The selected filter 408 includes an indication, in the form of an interface element 410, that one or more sub-filters for the selected filter 408 are selected. The interface element 410 includes a display of a number of sub-filters selected for the selected filter 408. As shown, selected filter 408, identified as "Woodwinds", includes the first selected sub-filter 404, identified as "Saxophone", and the second selected sub-filter 406, identified as "Flute". The interface element 410 includes the number "2", indicating that two sub-filters for "Woodwinds" are selected. If a third sub-filter were to be selected for "Woodwinds", the interface element 410 would include the number "3". Similarly, if either of "Saxophone" or "Flute" were to be unselected, the interface element 410 would display the number "1". The selected sub-filters may be unselected by tapping on the "X" next to the text of the selected sub-filter in the selected filters 402. Alternatively, the selected sub-filters 404, 406 may be unselected by tapping on the interface element 410 to reopen an interface (not shown) and tapping on each of the selected sub-filters to unselect the sub-filters.

FIG. 5 is a screenshot illustrating configurable and non-configurable filters. As described above, a configurable filter is a filter that is able to be selected and a non-configurable filter is a filter that is unable to be selected. Non-configurable filters include configurable sub-filters. In FIG. 5, configurable filter 502, identified as "Rhythmic", is a configurable filter as "Rhythmic" is a performance type, and therefore, is available for selection. Non-configurable filter 504, identified as "Playing Style", is a non-configurable filter as "Playing Style" is not a performance type, and therefore, is not available for selection. Instead, "Playing Style" is a category of performance types. By tapping an interface element 506 adjacent to the non-configurable filter 504, a user opens an Interface displaying configurable sub-filters 508 for the non-configurable filter 504. When the non-configurable filter 504 is selected, and the interface displaying the configurable sub-filters 508 opens, the non-configurable filter 504 and the interface element 506 associated with the non-configurable filter 504 are shaded to indicate that the interface of the configurable sub-filters 508 belongs to the non-configurable filter 504. The configurable sub-filters 508 for the non-configurable filter 504, identified as "Playing Style", include "Brushes", "Fingers", "Hands", "Picked", "Sticks", "Bowed", and "Plucked". Similar to other filters with sub-filters, when one or more of the sub-filters are selected for the non-configurable filter 504, the number of selected configurable sub-filters is displayed in place of the interface element 506. Selection of one or more of the configurable sub-filters is visually indicated by a checkmark (not shown) next to the selected configurable sub-filter.

Figure 6:
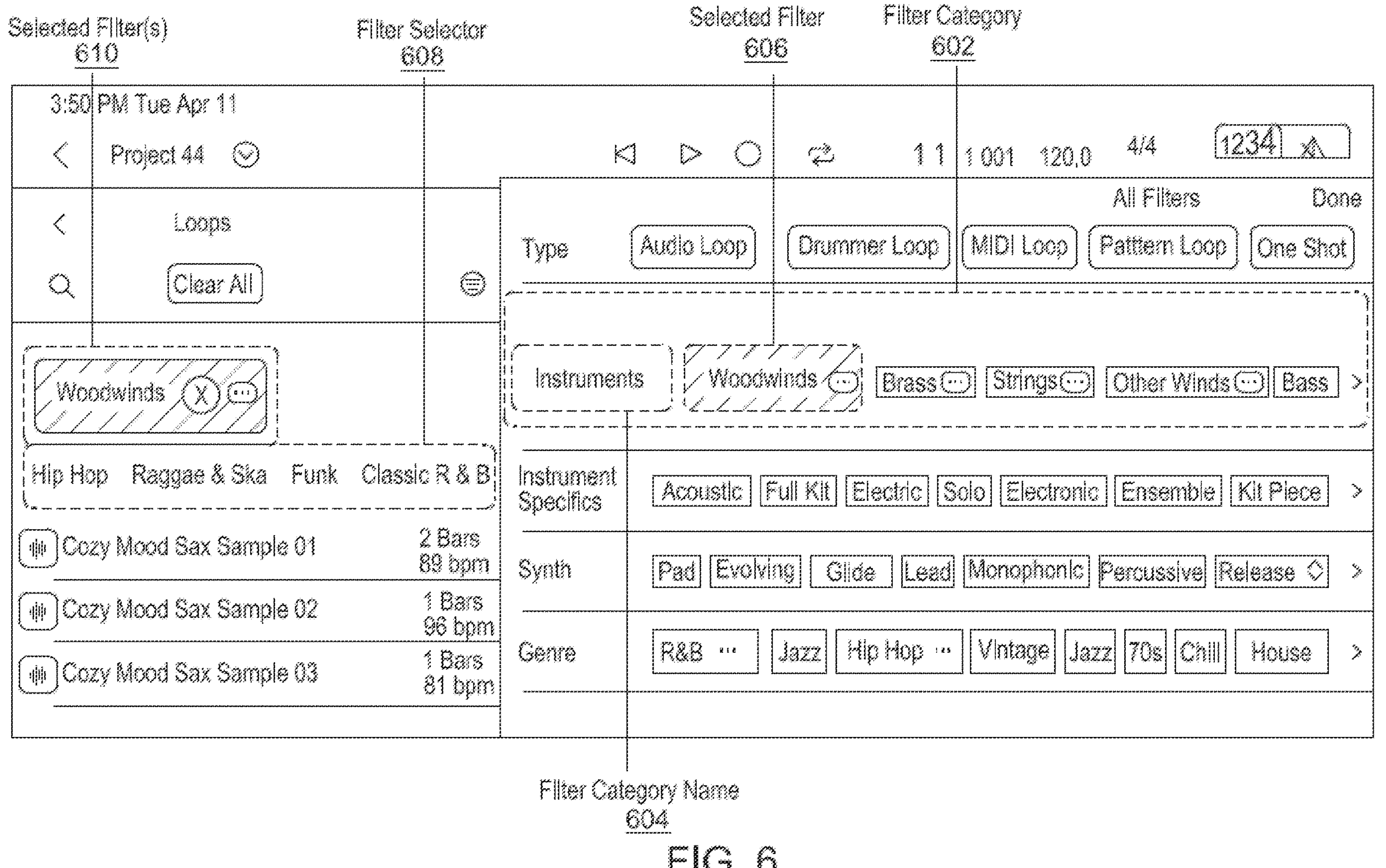
FIG. 6 is a screenshot illustrating a resorting of filters in a filtering and sorting operation.

FIG. 6 is a screenshot illustrating filter sorting and resorting. As shown, a selected filter 606, identified as "Woodwinds", is selected. An example of sorting of the filters may be seen by comparing the scrollable filters 206 identified in FIG. 2, with the filter selector 608 identified in FIG. 6. Additionally, a comparison of FIGS. 2 and 6 provides an example of resorting and/or reordering a list of matches, i.e., updating the list of matching media samples, in response to selection of a filter, and concurrent displaying of the updated matches and the resorted filters.

As shown in FIG. 2, the scrollable filters 206 include two rows of scrollable filters. The first row of scrollable filters 206 includes, from left to right, "Drums", "Keyboard", "Guitar" and "Mallets". The second row of scrollable filters includes "Rock", "R&B", "Hip Hop", "Acoustic", and "Jazz". As shown in FIG. 6, when "Woodwinds" is selected as a filter, the filters in the filter selector 608 are presented as a single row. As described above, the filters are arranged, from left to right, in order of the next best choice. User history is also considered in determining the next best choices. The filter selector 608 includes, from left to right, "Hip Hop", "Reggae & Ska", "Funk", and "Classic R&B". As will be described in further detail below, additional filters may be viewed by swiping through the row of filters in the filter selector 608.

As shown in FIG. 2, a list of media samples, identified as matches 208, are presented in alphabetical order. As described above, the matches are presented alphabetically because each of the media samples includes a tag for the "Loop" content type, no additional filter have been selected, and the list is extensive. Turning to FIG. 6, display of matches in the list of matches is different from the display of matches in the list of the matches shown in FIG. 2. In this manner, the list of matches prior to selection of a filter, as shown in FIG. 2, are updated upon selection of a filter, and displayed as an updated list of matches, as shown in FIG. 6. Updating the list of matches may include filtering the matches and/or reordering the matches. The matches displayed in the updated list of matches is different from the matches displayed in the list of matches. Any or all of the previously displayed matches may have been filtered from the updated list of matches for not including the tag corresponding to the selected filter. Any or all of the previously displayed matches may have been ordered as a result of a sorting of the matches.

Another example of the sorting of the filters may be seen with further reference to FIGS. 2 and 6. In FIG. 2, prior to selection of "Woodwind", the filter category identified as "Instruments" includes, from left to right, selectable filters, "Guitar", "Piano", "Bass", "Synth", "Full Band" "Drums", and "Keyboard". In FIG. 6, subsequent to selection of "Woodwinds" from the "Instruments" filter category, the selectable filters include "Brass", "Strings", "Other Winds", and "Bass".

An additional example of the filtering feature may be seen with continued reference to FIGS. 2 and 6, and with reference to the filters in the filter category identified as "Synth". In FIG. 2, filters available for selection in the filter category identified as "Synth" include, from left to right, "Percussive", "Polyphonic", and "Glide". Filters that are not available for selection in the "Synth" filter category include, from left to right, "Lead", "Pad", "Monophonic", and "Evolving". As shown in FIG. 6, subsequent to selection of "Woodwinds", the filter category identified as "Synth" includes, from left to right, selectable filters including, "Pad", "Evolving", "Glide", "Lead", "Monophonic", "Percussive", and "Release". As described above, the next best choices are those filters that will divide the media samples that match the selected filters approximately in half.

FIG. 7 illustrates visual indications of selected and non-selected filters in a graphical user interface 700. As shown, selected filters 701 include a selected filter 702, a selected filter 704*a*, and a selected filter 706*b*. The selected filter 702, identified as "Guitar", is a filter positioned in the filter category identified as "Instruments". As described above, a user selects a filter by tapping on the desired filter, in either the scrollable filter or expanded filter interface. When a filter is selected, the text and any attributes for the selected filter are displayed in the selected filters 701. As shown, the selected filter 702 includes a first hatched background that appears both in the expanded filter interface and the selected filter interface. Alternatively, the selected filter 702 includes a colored or highlighted background.

As described above, each filter in the filtering and sorting operation corresponds to a tag. The filters may be Boolean or non-Boolean. Non-Boolean filters include corresponding percentage tags. An example of a Boolean filter is "Guitar". Either the media sample includes a guitar, or the media sample does not include a guitar. An example of a paired set of non-Boolean tags is "Bright" and "Dark". A media sample that is fully bright is assigned a percentage tag of 1 and a media sample that is fully dark is assigned a percentage tag of 0. A media sampling including a percentage between 0 and 1 for "Bright" or "Dark" indicates that the media sample is only partially "Bright" or only partially "Dark". The percentage to which a media sample is partially a specified parameter is used to rank the filtered matches. For example, when "Bright" is selected as a filter, all media samples including a tag for the selected filter "Bright" will appear in the filtered results. However, a media sample with a brightness percentage tag of 0.7 will be displayed ahead of a media sample with a brightness percentage tag of 0.6, as the media sample with the 0.7 percentage tag is more relevant to the selected filters. In this manner, a media sample that is a closer match to the selected filters, i.e., brighter than another media sample, will be presented ahead of the media sample with the lower percentage tag.

As described above, partial matches are media samples that include some, but not all of the tags corresponding to the selected filters. For example, as shown in FIG. 7, partial matches 708*a* . . . 708*n* are results of a filtering process including selection of "Guitars", "Bright", and "Prominent". The partial matches 708*a* . . . 708*n* include tags from one or two of the three filters, but not tags from all three filters. As noted above, a partial match may include tags for "Guitar" and "Bright", but not include a tag for "Prominent", or include tags for "Bright" and "Prominent", but not include a tag for "Guitar", or include tags for "Guitar" and "Prominent", but not include a tag for "Bright". Had the media sample included a tag corresponding to each of the three filters, "Guitars", "Bright", and "Prominent", the media sample would not be identified as a partial match and would instead be identified as a match. Non-Boolean filters and percentage tags are also used to arrange the order of presentation of the partial matches, with the media samples being presented in order of diminishing relevancy to the selected filters.

Figures 8A, 8B:
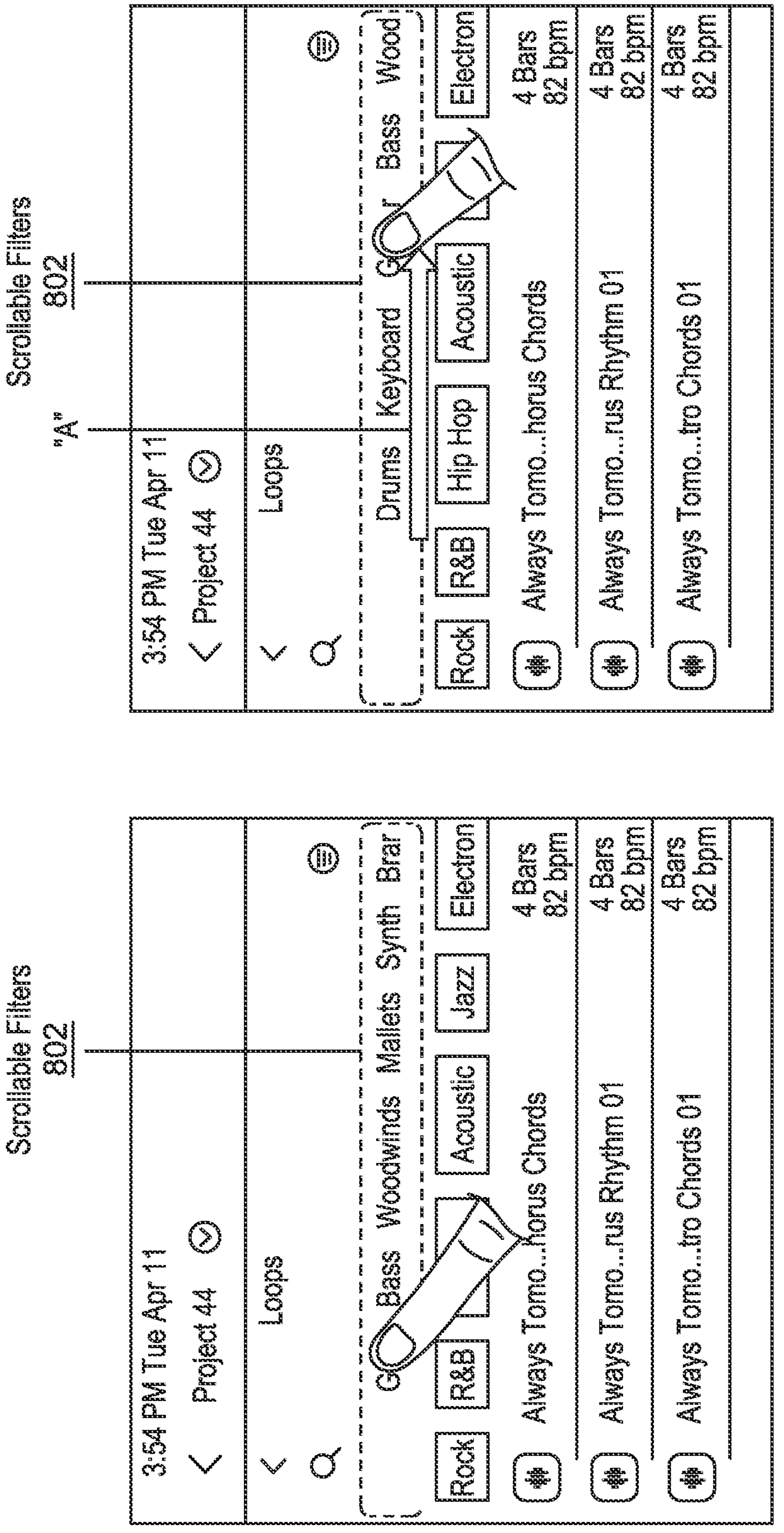
FIGS. 8A and 8B are screenshots illustrating scrolling of scrollable filters in a filtering and sorting operation.

FIGS. 8A and 8B illustrate a scrollable interface for viewing and selecting filters. The scrollable filters 802 is engaged by touching and holding an area within the scrollable filters 802, as indicated by the finger in FIG. 8A. Horizontal movement of the user's finger along the row of filters while holding the finger in contact with the interface, as indicated by arrow "A", causes the row of filters to move with the finger. In this manner, additional filters may be displayed with the scrollable filters 802. Release of the finger from engagement with the scrollable filter 802 leaves the filters in their current position within the interface. One or more of the filters may then be selected by tapping on the desired filter.

As shown in FIGS. 8A and 8B, the scrollable filters 802 includes, from left to right, "Drums", "Keyboard", "Guitar", "Bass", "Woodwinds", "Mallets", and Synth". In FIG. 8A, "Drums", "Keyboard", and "Guitar" are not visible within the scrollable filters 802. By touching and holding within the scrollable filters 802 and moving the finger horizontally along the scrollable filters 802, as indicated by arrow "A", a user may scroll through the scrollable filters 802. The ability to scroll through the filters provides a simple and effect way for a user to view multiple filters using limited space. As described in detail above, the scrollable filters 802 are presented in order of next best choices. Thus, starting from the left, the first filter in the scrollable filters 802 is the first next best choice, and the filters to the right of the first filter are presented in a ranking of diminishing next best choices. In this manner, the further right a filter is, the farther the filter is from dividing the matches in half. As also described in detail above, user history is considered in determining the filters to present as next best choices.

Figure 9:
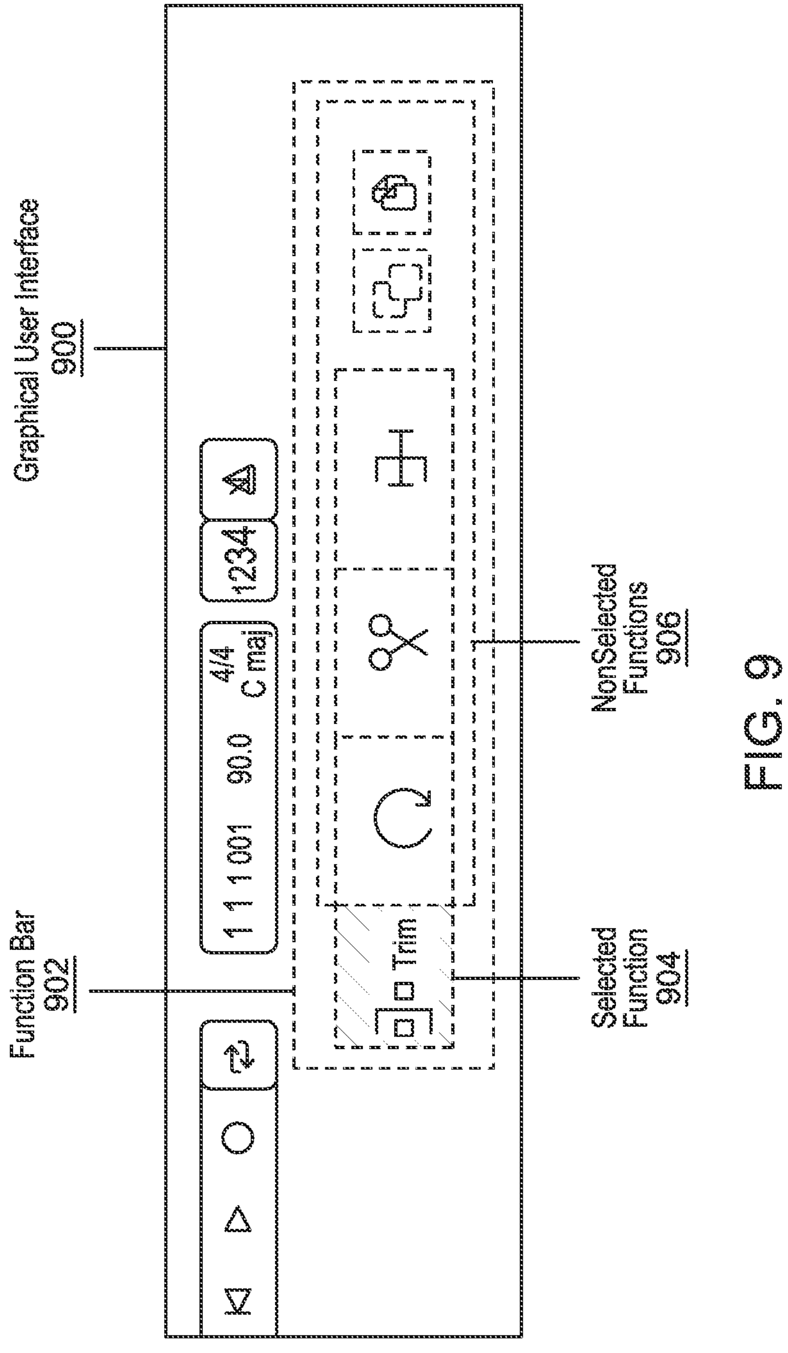
FIG. 9 is a screenshot illustrating a function bar for a media production application.

FIG. 9 illustrates a function bar for selecting various editing tools and operations. The function bar 902 includes display of a selected function 904 and display of non-selected functions 906. Each of the functions available for selection includes a glyph or other graphic representation. The function that is selected is indicated by highlighting or hatching of the background of the function. The selected function 904 also includes text identifying the function. For example, as shown in FIG. 9, the selected function 904 includes a hatched background, a glyph representing the trim function, and accompanying text identifying "Trim" as the selected function. The non-selected functions 906 include only a glyph identifying each of the tools or operations. When an editing tool is selected by tapping on the glyph identifying the desired function, user interaction within the interface in which the function bar 902 is attached, performs the function that is selected. For example, when the "Trim" function is selected, user interaction with the interface to which the function bar 902 is attached performs a trim operation to a media sample, allowing trimming of the media sample (not shown).

The function bar 902 includes a temporary mode. The temporary mode allows a function to be temporarily selected. To temporarily select a function, a user touches and holds the interface, with a first finger, on a glyph corresponding to the function the user wishes to temporarily engage. After a predetermined time holding on the glyph of the function, the function becomes temporary selected. The function will stay temporary selected until the user releases the first finger from the interface. While holding the glyph of the selected function with the first finger, a second finger may be used to perform the selected function. Release of the first finger from engagement with the glyph of the temporarily selected function, returns the function selection to the prior selected function.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 10:
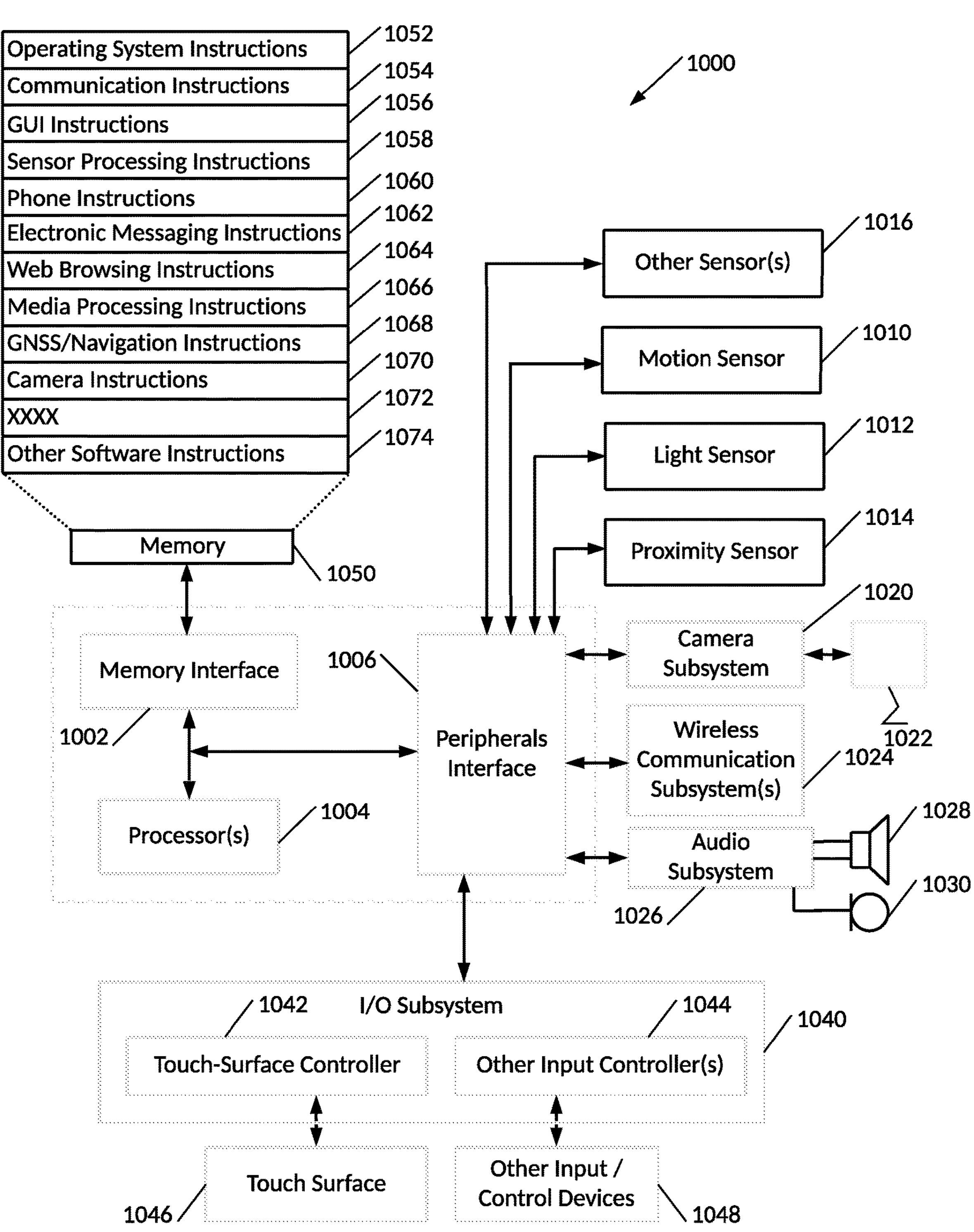
FIG. 10 is a block diagram of an example computing device that can implement the features and processes of FIGS. 1-9.

FIG. 10 is a block diagram of an example computing device 1000 that can implement the features and processes of FIGS. 1-9. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate orientation, lighting, and proximity functions. Other sensors 1016 can also be connected to the peripherals interface 1006, such as a global navigation satellite system (GNSS) (e.g., GPS receiver), a temperature sensor, a biometric sensor, magnetometer or other sensing device, to facilitate related functionalities.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips. The camera subsystem 1020 and the optical sensor 1022 can be used to collect images of a user to be used during authentication of a user, e.g., by performing facial recognition analysis.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the computing device 1000 is intended to operate. For example, the computing device 1000 can include communication subsystems 1024 designed to operate over a GSM network, a GPRS network, an EDGE network, a Wi-Fi or WiMax network, and a Bluetooth™ network. In particular, the wireless communication subsystems 1024 can include hosting protocols such that the device 1000 can be configured as a base station for other wireless devices.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, voiceprinting and voice authentication, for example.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some implementations, the computing device 1000 can present recorded audio and/or video files, such as MP3, AAC, and MPEG files. In some implementations, the computing device 1000 can include the functionality of an MP3 player, such as an iPod™.

The memory interface 1002 can be coupled to memory 1050. The memory 1050 can include high-speed random-access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks.

The operating system 1052 can include instructions for handling basic system services and for performing hardware dependent tasks. In some implementations, the operating system 1052 can be a kernel (e.g., UNIX kernel). In some implementations, the operating system 1052 can include instructions for performing filtering and sorting operations. For example, operating system 1052 can implement the filtering and sorting features as described with reference to FIGS. 1-8B.

The memory 1050 can also store communication instructions 1054 to facilitate communicating with one or more additional devices, one or more computers and/or one or more servers. The memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and instructions; and/or camera instructions 1070 to facilitate camera-related processes and functions.

The memory 1050 can store software instructions 1072 to facilitate other processes and functions, such as the filtering and sorting processes and functions as described with reference to FIGS. 1-8B.

The memory 1050 can also store other software instructions 1074, such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions of the computing device 1000 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A non-transitory computer-readable medium comprising instructions that, when executed by one or more hardware processors, cause the one or more hardware processors to perform operations comprising:

displaying a list comprising a first set of results;

concurrently with displaying the list comprising the first set of results, displaying a first set of filters in a first order, wherein the first set of filters comprises a first filter, a second filter, and a third filter;

responsive to receiving user input associated with selection of selecting the first filter from the first set of filters:

updating the list based on the selection of the first filter to generate an updated list comprising a second set of results;

displaying the updated list corresponding to the first filter; and determining, based on the selection of the first filter, a second order of a second set of filters that comprise the second filter and the third filter, wherein determining the second order for the second set of filters comprises:

determining that selection of the third filter splits the second set of results in the updated list, corresponding to the first filter, more evenly than selection of the second filter;

wherein the second filter, that was ordered prior to the third filter in the first order for the first set of filters, is ordered subsequent to the third filter in the second order for the second set of filters based at least in part on determining that selection of the third filter would split the second set of results in the updated list, corresponding to the first filter, more evenly than selection of the second filter; and concurrently with displaying the updated list, displaying the second set of filters in the second order.

2. The non-transitory computer-readable medium of claim 1, wherein updating the list based on the first filter comprises filtering the list to (a) include a first subset of results, of the first set of results, that are associated with a tag corresponding to the first filter and (b) exclude a second subset of results, of the first set of results, that are not associated with the tag corresponding to the first filter.

3. The non-transitory computer-readable medium of claim 1, wherein updating the list based on the first filter comprises resorting the list to increase a ranking of a first result to be higher than a ranking of a second result based on the first result comprising characteristics that are closer to the first filter than characteristics comprised in the second result.

4. The non-transitory computer-readable medium of claim 1, wherein the operations further comprise determining the second set of filters at least by removing the first filter from the first set of filters.

5. The non-transitory computer-readable medium of claim 1, wherein determining the second order is based further on a user's historical usage of the second filter and the third filter in the second set of filters to filter results.

6. The non-transitory computer-readable medium of claim 1, wherein receiving the user input selecting the first filter comprises receiving user input selecting one or more of a plurality of sub-filters associated with the first filter, and wherein the operations further comprise displaying a number in association with the first filter that indicates a number of sub-filters associated with the first filter that have been selected.

7. A method comprising:

displaying a list comprising a first set of results;

concurrently with displaying the list comprising the first set of results, displaying a first set of filters in a first order, wherein the first set of filters comprises a first filter, a second filter, and a third filter;

responsive to receiving user input associated with selection of the first filter from the first set of filters:

updating the list based on the selection of the first filter to generate an updated list corresponding to the first filter and comprising a second set of results;

displaying the updated list corresponding to the first filter; and determining, based on the selection of the first filter, a second order of a second set of filters that comprise the second filter and the third filter, wherein determining the second order for the second set of filters comprises:

determining that selection of the third filter splits the second set of results in the updated list, corresponding to the first filter, more evenly than selection of the second filter;

wherein the second filter, that was ordered prior to the third filter in the first order for the first set of filters, is ordered subsequent to the third filter in the second order for the second set of filters based at least in part on determining that selection of the third filter would split the second set of results in the updated list, corresponding to the first filter, more evenly than selection of the second filter; and concurrently with displaying the updated list, displaying the second set of filters in the second order;

wherein the method is performed by at least one device including a hardware processor.

8. The method of claim 7, wherein updating the list based on the first filter comprises filtering the list to (a) include a first subset of results, of the first set of results, that are associated with a tag corresponding to the first filter and (b) exclude a second subset of results, of the first set of results, that are not associated with the tag corresponding to the first filter.

9. The method of claim 7, wherein updating the list based on the first filter comprises resorting the list to increase a ranking of a first result to be higher than a ranking of a second result based on the first result comprising characteristics that are closer to the first filter than characteristics comprised in the second result.

10. The method of claim 7, further comprises determining the second set of filters at least by removing the first filter from the first set of filters.

11. The method of claim 7, wherein determining the second order is based further on a user's historical usage of the second filter and the third filter in the second set of filters to filter results.

12. The method of claim 7, wherein receiving the user input selecting the first filter comprises receiving user input selecting one or more of a plurality of sub-filters associated with the first filter, and further comprising, displaying a number in association with the first filter that indicates a number of sub-filters associated with the first filter that have been selected.

13. A system comprising:

one or more hardware processors; and the system being configured to perform operations comprising:

displaying a list comprising a first set of results;

concurrently with displaying the list comprising the first set of results, displaying a first set of filters in a first order, wherein the first set of filters comprises a first filter, a second filter, and a third filter;

responsive to receiving user input associated with selection of the first filter from the first set of filters:

updating the list based on the selection of the first filter to generate an updated list corresponding to the first filter and a second set of results;

displaying the updated list corresponding to the first filter; and determining, based on the selection of the first filter, a second order of a second set of filters that comprise the second filter and the third filter, wherein determining the second order for the second set of filters comprises:

determining that selection of the third filter splits the second set of results in the updated list, corresponding to the first filter, more evenly than selection of the second filter;

wherein the second filter, that was ordered prior to the third filter in the first order for the first set of filters, is ordered subsequent to the third filter in the second order for the second set of filters based at least in part on determining that selection of the third filter would split the second set of results in the updated list, corresponding to the first filter, more evenly than selection of the second filter; and concurrently with displaying the updated list, displaying the second set of filters in the second order.

14. The system of claim 13, wherein updating the list based on the first filter comprises filtering the list to (a) include a first subset of results, of the second set of results, that are associated with a tag corresponding to the first filter and (b) exclude a second subset of results, of the first set of results, that are not associated with the tag corresponding to the first filter.

15. The system of claim 13, wherein updating the list based on the first filter comprises resorting the list to increase a ranking of a first result to be higher than a ranking of a second result based on the first result comprising characteristics that are closer to the first filter than characteristics comprised in the second result.

16. The system of claim 13, wherein the operations further comprise determining the second set of filters at least by removing the first filter from the first set of filters.

17. The system of claim 13, wherein determining the second order is based further on a user's historical usage of the second filter and the third filter in the second set of filters to filter results.

18. The non-transitory computer-readable medium of claim 1, wherein the first set of results and the second set of results comprise media samples.

19. The non-transitory computer-readable medium of claim 1, wherein the first set of results and the second set of results comprise search results.

* * * * *